United States Patent [19]

Liu

[11] Patent Number: 5,788,820

[45] Date of Patent: Aug. 4, 1998

[54] DEVICE FOR ELECTROLYZING WATER

[76] Inventor: Cheng-li Liu, No. 48, Hsintung Rd., Toufen Chen, Miaoli Hsien, Taiwan

[21] Appl. No.: 705,303

[22] Filed: Aug. 29, 1996

[51] Int. Cl.$^6$ .................................................. C25B 9/00
[52] U.S. Cl. .................. 204/212; 204/272; 204/275; 204/284
[58] Field of Search ................... 204/212, 272, 204/260, 275, 284

[56] References Cited

U.S. PATENT DOCUMENTS

| | | |
|---|---|---|
| 1,682,426 | 8/1928 | Schütte .................................. 204/212 |
| 2,849,296 | 8/1958 | Certa ................................... 204/212 X |
| 3,108,031 | 10/1963 | Hasala et al. ...................... 204/212 X |
| 3,196,095 | 7/1965 | Wadsworth ....................... 204/212 X |

Primary Examiner—Donald R. Valentine
Attorney, Agent, or Firm—Watson Cole Grindle Watson, P.L.L.C.

[57] ABSTRACT

A device for electrolyzing water includes pivots separately arranged on two ends of an insulating container, and a cylindrical cathode and a cylindrical anode are separately and respectively connected to the two pivots. The cathode and the anode are coaxial to the container and a plurality of through-holes are defined in sidewall of the anode and the cathode. A direct current (DC) source is provided to attach the two pivots so that the cathode and the anode are charged. A power source is provided to separately rotate the two pivots so as to rotate the anode and the cathode. The rotation velocity of the anode is different from that of cathode, thereby inducing a layer of dialytic film therebetween. Two input and output vents are separately and respectively defined in two ends of the container. An output vent is arranged on a side of the pivot connecting the anode so as to collect acidic electrolyzed water.

7 Claims, 4 Drawing Sheets

5,788,820

1

DEVICE FOR ELECTROLYZING WATER

The present invention relates to a device for electrolyzing water. In particular, the present invention relates to a device for electrolyzing water to produce basic and acidic electrolyzed water.

BACKGROUND OF THE INVENTION

Due to the development of civilization, the environment has recently been severely polluted by industrial, commercial and residential waste products, especially water supplies have been harshly polluted by various poisonous wastes, thus, untreated water cannot be consumed directly as before.

In order to produce purer and safer water, various purifying instruments and processes are adopted. These instruments and processes are based on the methods of filtering, sterilizing, absorbing (activated carbon), distilling or ion exchanging. However, all the instruments and processes are expensive and inefficient, thus they are uneconomical.

Recently, a new water-purifying instrument is provided. This instrument is based on the principle of electrolyzing in combination with filtering, which essentially comprises an insulating container, two electrodes (anode and cathode) and a dialyzing film to separate the two electrodes and to divide the container into two parts. Water molecule dissociates into hydrogen ion $H^+$ (cation) and hydroxy ion $OH^-$ (anion). As to pure water, both the dissociation constants for hydrogen ions $H^+$ and hydroxy ions $OH^-$ are $10^{-7}$. That is, the pH value for pure water is 7. Usually, water molecules do not exist as a single molecule. Water molecules will naturally agglomerate together to form clusters because of hydrogen bonding. A cluster of water molecules always contains 6 to 15 water molecules.

Hydrogen ions ($H^+$) will also agglomerate with the water cluster to form hydronium ions, such as $H_3O^+$, $H_7O_3^+$, etc. When electrolyzing, hydrogen ions ($H^+$) will accept an electron to form hydrogen gas ($H_2$). The reaction formula is:

$$2H^+ \text{ (or } 2H_3O^+\text{)} + 2e^- \rightarrow H_2 + (2H_2O) \tag{I}$$

Hydroxy ions will lose an electron to form oxygen gas and water. The reaction formula is:

$$4OH^- \text{ (or } 4H_3O_2^-\text{)} - 4e^- \rightarrow 2H_2O \text{ (or } 6H_2O\text{)} + O_2 \tag{II}$$

According to the new water-purifying instrument for electrolyzing water, water is divided to two parts by the dialyzing film, which can prevent hydrogen ions ($H^+$) and hydroxy ions ($OH^-$) passing freely. As the proceeding of electrolyzation, the reactions of formulas (I) and (II) will simultaneously react, and hydrogen and oxygen are continuously produced. Hydrogen and oxygen can be collected by a proper instrument.

At the anode, the electrolyzing reaction is an oxidizing reaction of formula (II). In order to simply the formulas, all the hydronium ions ($H_3O^+$, $H_7O_3^+$, $H_3O_2^-$ or $H_7O_4^-$) are represented by $H^+$ or $OH^-$:

$$H_2O \rightarrow H^+ + OH^- 4OH^- - 4e^- \rightarrow O_2 + 2H_2O \tag{II}$$

Under such circumstance, the concentration of $H^+$ increases as the electrolyzation proceeds, which will induce the pH value to decrease. That is, the water contained in the part containing the anode is acidic electrolyzed water. Additionally, if other anions exist, such as chloro ($Cl^-$), fluoro ($F^-$) or cyano ($CN^-$), electrolyzation will oxidize these anions, so that they can be expelled from the water. The oxidizing reaction of the anion is, for example chloro ($Cl^-$):

2

$$2Cl^- - 2e^- \rightarrow Cl_2.$$

At the cathode, the electrolyzing reaction is a reducing reaction of formula (I):

$$H_2O \rightarrow OH^- + H^+ 2H^+ + 2e^- \rightarrow H_2 \tag{I}$$

Under such circumstance, the concentration of $OH^-$ increases as the electrolyzation proceeds, which induces the pH value to increase. That is, the water contained in the part containing the cathode is basic electrolyzed water. Additionally, if other cations exist, such as the ions of alkali metals or alkaline earth metals, electrolyzation will reduce and precipitate these cations, then these precipitates can be filtered out from the water by conventional manners. The reducing reaction of the cation is, for example $Ca^{2+}$, is:

$$Ca^{2+} + 2e^- \rightarrow Ca.$$

The dialyzing film is a porous film, and is mostly manufactured from silicates. When being used, the pores of the dialyzing film are easily blocked, or the film per se is easily eroded, and loses its separating characteristic. Therefore, the dialyzing film must be replaced frequently so as to maintain its dialyzing characteristic.

SUMMARY OF THE INVENTION

One object of the present invention is to provide a device for electrolyzing water to produce basic electrolyzed water and acidic electrolyzed water.

Another object of the present invention is to provide a device of electrolyzing water for producing basic electrolyzed A water and acidic electrolyzed water, which will form a layer of dialytic film between an anode and a cathode.

Yet another object of the present invention is to provide a device of electrolyzed water, comprising two pivots which are separately arranged on two ends of an insulating container, wherein a cylindrical cathode and a cylindrical anode are separately connected to the two pivots, the cathode and the anode are coaxial to the container; a plurality of through-holes are defined in sidewalls of the anode and the cathode. A direct current source is attached to the two pivots so that the anode and cathode are charged. A power source is provided to separately rotate the two pivots so as to rotate the anode and the cathode. The rotation velocity of anode is different from that of the cathode, and the difference of the rotation velocity between the anode and cathode will induce a layer of dialytic film to form therebetween. Two input and output vents are respectively defined in the two ends of the container. An output vent is arranged on the side of the pivot of connecting the anode so as to collect acidic electrolyzed water.

Other objects, advantages, and novel features of the invention will become more apparent from the following detailed description when taken in conjunction with the accompanying drawings

THE DESCRIPTION OF THE DRAWINGS

THE DETAILED DESCRIPTION OF THE PREFERRED EMBODIMENT

Figure 1:
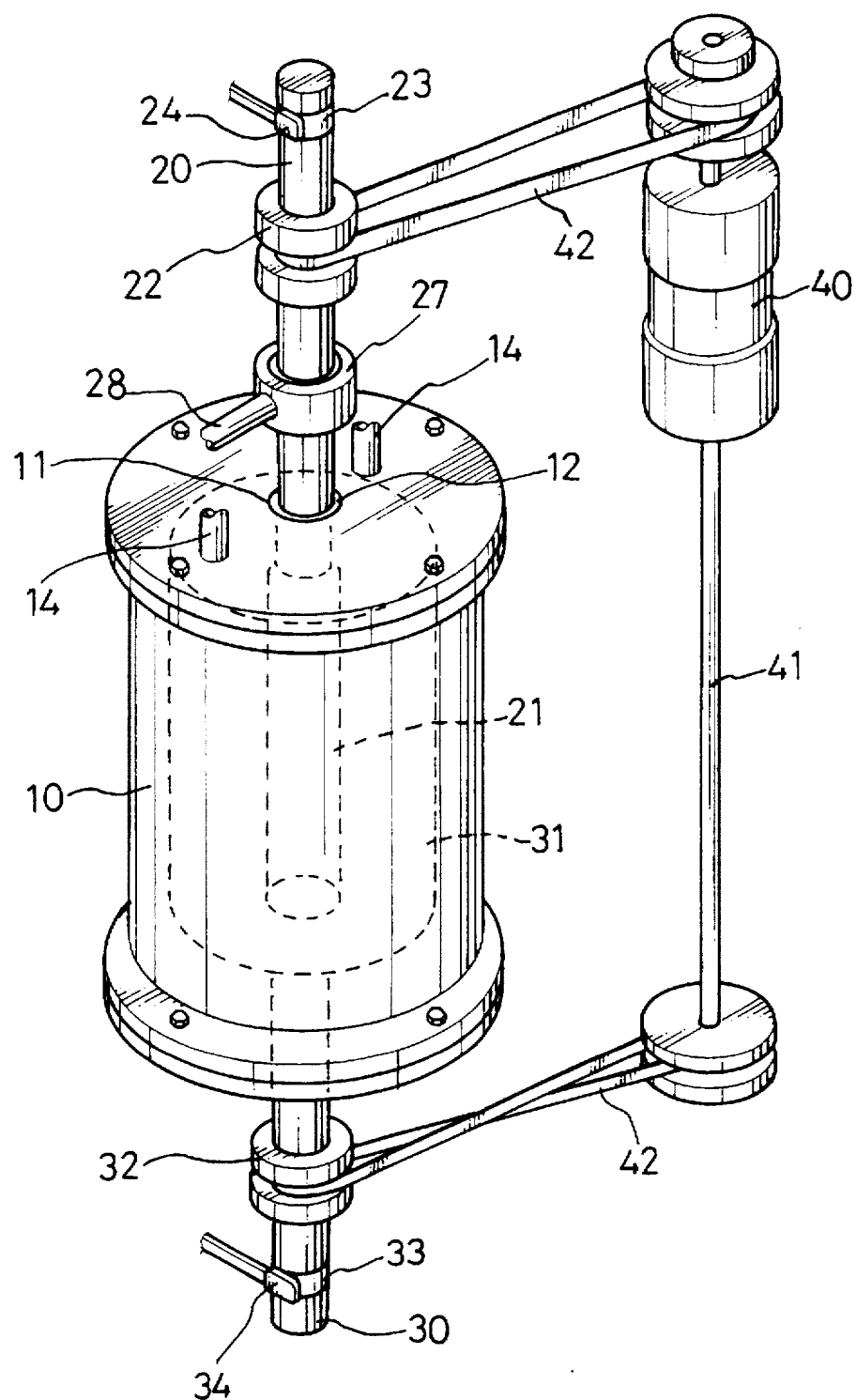
FIG. 1 is a perspective view of the device of electrolyzing water according to the present invention.

Referring to FIG. 1, the present device for electrolyzing water comprises two pivots 20 and 30 separately and respectively arranged on two ends of an insulating container 10. A cylindrical cathode 31 and a cylindrical anode 21 are separately and respectively connected to the two pivots 30 and 20. Additionally, the cathode 31 and anode 21 are coaxial to the container 10. Copper rings 23 and 33, as well as electrical brushes 24 and 34, are separately and respectively connected to the pivots 20 and 30; thus, a direct current (DC) source can be provided to the anode 21 and cathode 31 through the copper rings 23 and 33, and respective electrical brushes 24 and 34. A pair of grooved wheels 22 and 32 are separately disposed on respective distal ends of the pivots 20 and 30, so as to connect a power source 40, such as a motor. Rotation velocities of the anode 21 and the cathode 31 are different due to the grooved wheels 22 and 32 having different radii, and to different directions of a pair of transmitting belts 42.

Figure 2:
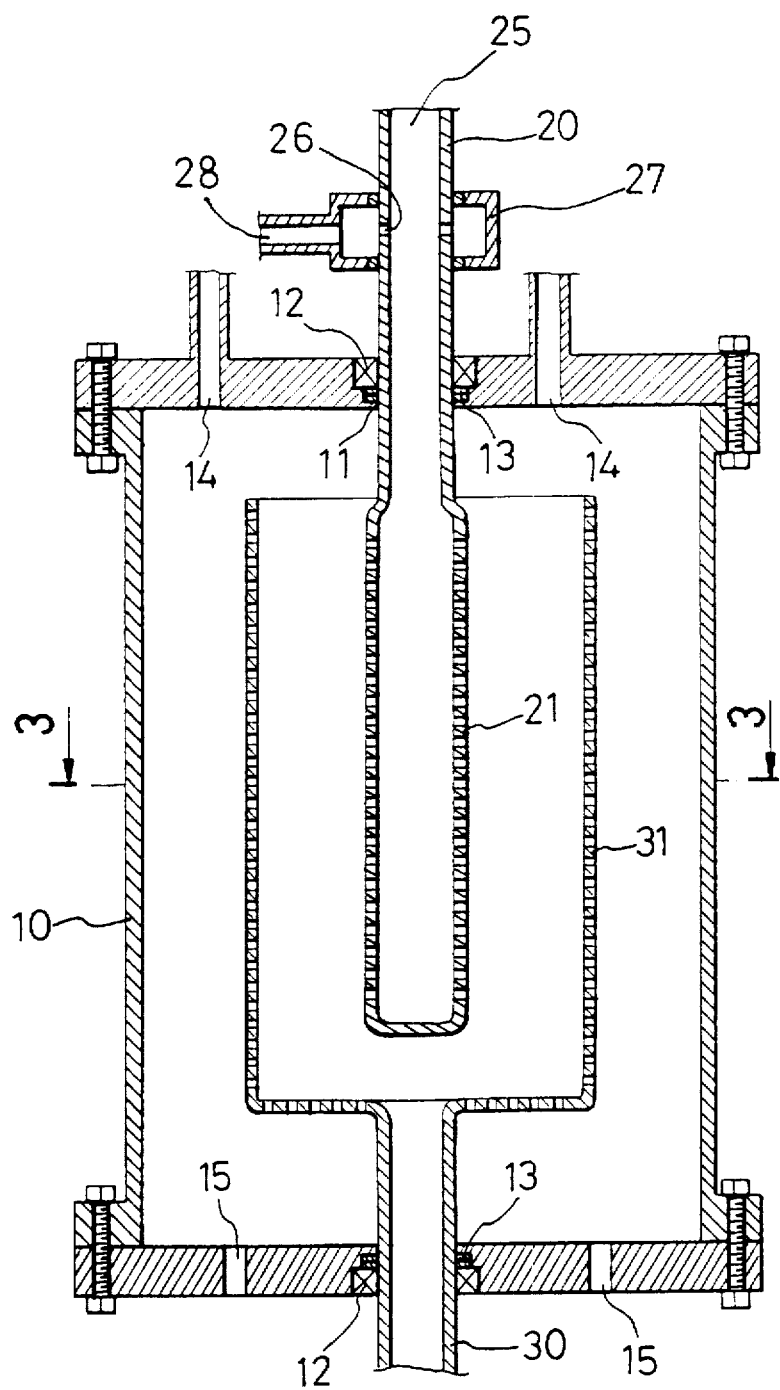
FIG. 2 is a longitudinal cross sectional view of the present invention along with the axis the pivots.

FIG. 2 is a longitudinal cross sectional view of the present invention along with an axis of the two pivots 20 and 30. It is seen that two pivot holes 11, two bearings 12 and two sealing rings 13 are respectively disposed on the two ends of the insulating container 10 to bear the two pivots 20 and 30. Additionally, two input vents 14 are defined in one (preferably a top) end of the insulating container 10 and two output vents 15 are defined in the second end of the insulating container 10 so as to input water and to output electrolyzed water. The anode 21 is connected to the pivot 20 and is designed in the shape of hollow cylinder. A first plurality of through-holes are homogeneously defined in a sidewall of the anode 21 so that water can liberally flow therethrough. Although the size of the through-hole in the sidewall of the anode 21 is not critical to the present invention, the preferred range of the hole size is from 0.5 mm to 10 mm. The pivot 20 and anode 21 define a passage 25, which will bring water electrolyzed around the anode 21 to an orifice 26. A water-collecting chamber 27 is disposed outside the pivot 20 to collect the water from the orifice 26, and a drainpipe 28 is disposed to the water-collecting chamber 27 so as to drain the water.

A cathode 31 is connected to the pivot 30, and the cathode 31 is also designed in the shape of a hollow cylinder. The cathode 31 and the anode 21 in the insulating container 10 overlap, with the anode 21 being received inside the cathode 31. A second plurality of through-holes are also homogeneously defined in a sidewall of the cathode 31, so that water can liberally flow through cathode 31 without resistance.

Figure 3:
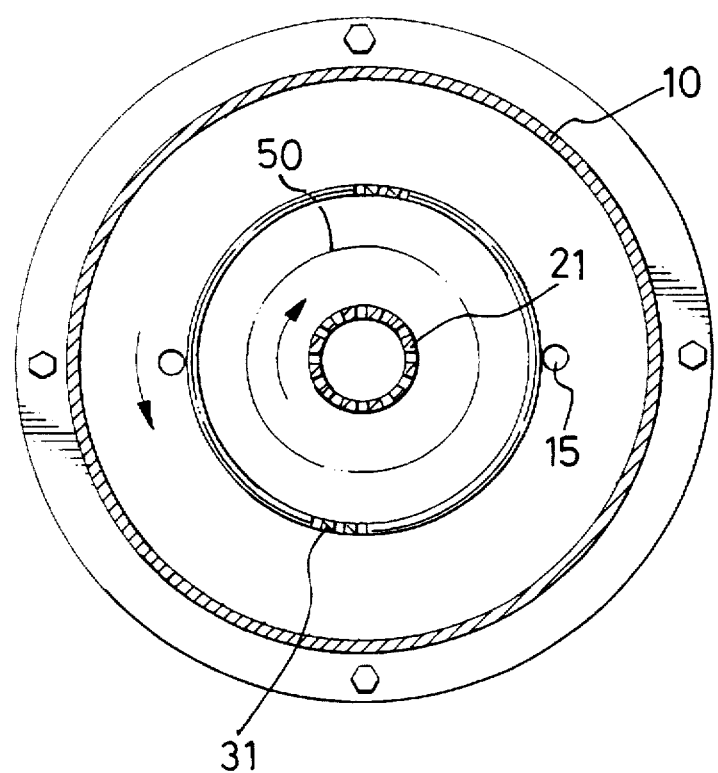
FIG. 3 is a radial cross sectional view of the present invention along with line 3 of FIG. 2.

Referring to FIGS. 1 and 3, as the power source 40 is started, a transmitting shaft 41 will drive the transmitting belts 42, and the transmitting belts 42 then drive the grooved wheels 22 and 32. Because the respective radii of the grooved wheels 22 and 32 are different, the rotation velocities of the anode 21 and the cathode 31 are not the same. In rotation, the anode 21 and the cathode 31 will drive the water contained in the insulating container 10 to rotate. Therefore, a layer of dialytic film 50 will be formed within a limited region between the anode 21 and the cathode 31. The rotation velocity of the dialytic film 50 is dramatically different from that near the anode 21 and cathode 31. Thus, the water electrolyzed around the anode 21 will not mix with the water around the cathode 31. That is to say, acidic electrolyzed water produced in the anode 21 and basic electrolyzed water produced in cathode 31 will not mix together.

Further referring to FIG. 2, the basic electrolyzed water flows out from the output vent 15. A filter (not shown in the figs.) can be provided to further purify the water flowing out from the vent 15. The acidic electrolyzed water produced around the anode 21 is drained out from the anode 21 through the passage 25 defined by the pivot 20 and the anode 21 to an orifice 26. The acidic electrolyzed water is collected in the water-collecting chamber 27, then it drains out from the drainpipe 28. The acidic electrolyzed water is expelled from the anode 21 through passage 25 to the water-collecting chamber 27 by means of a siphoning effect.

Additionally; the water contained in the insulating container 10 is kept rotating, thus, any solid particles or precipitates will be forced outward, which can further purify the water.

Figure 4:
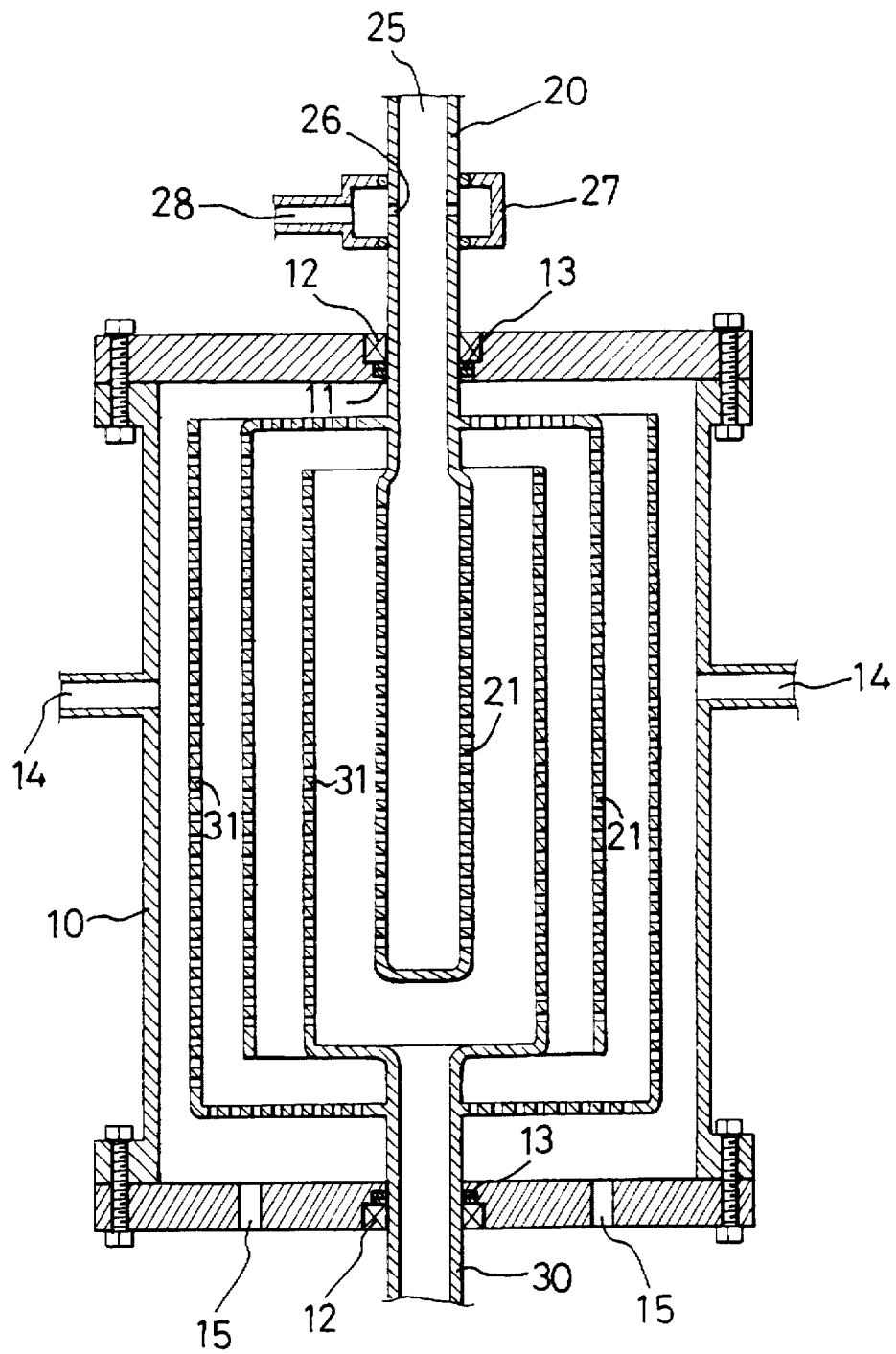
FIG. 4 is a longitudinal cross sectional view of another embodiment according to the present invention, wherein two layers of an anode and a cathode are alternately arranged in an insulating container.

Referring to FIG. 4, a longitudinal cross sectional view of another embodiment according to the present invention is shown, wherein the anode 21 comprises a first pair of co-axial drums and the cathode 31 comprises a second pair of co-axial drums alternately arranged in the insulating container 10 so as to increase the contact area between water and the electrodes (anode 21 and cathode 31). The increased contact area between the electrodes and water can enhance the electrolyzing efficacy, and increase its productivity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed:

1. A device for electrolyzing water which comprises
   an insulating container defining opposite first and second end walls which include respective input and output vent openings,
   a first pivot which extends through said first end wall into said insulating container,
   a cylindrical cathode connected to said first pivot in said insulated container so as to be coaxial with said container, said cathode providing a side wall with through-holes therein,
   a second pivot which extends through said second end wall into said insulating container, said second pivot including a side vent opening for discharging acidic electrolyzed water therefrom,
   a cylindrical anode connected to said second pivot in said insulated container so as to be coaxial with said container, said anode providing a side wall with through-holes therein,
   drive means for rotating said first and second pivots in opposite directions and at differing velocities so as to create a layer of dialytic film between said anode and said cathode, and respective contact means contacting said first and second pivots for conveying direct current through said device.

2. A device for electrolyzing water according to claim 1, wherein the cylindrical cathode and cylindrical anode are include multiple side walls, the multiple side walls of the anode and cathode being alternately arranged, so as to increase the contacting surface of water and the cathode and the anode.

3. A device for electrolyzing water according to claim 1, wherein the insulating container is cylindrical.

4. A device for electrolyzing water according to claim 1, wherein the anode and cathode are changeable with each other.

5. A device for electrolyzing water according to claim 1, wherein each said first and second pivots include a copper ring and wherein each of said contact means comprises an electric brush in contact with a respective copper ring.

6. A device for electrolyzing water according to claim 1, wherein said first pivot is hollow, and wherein said side vent opening is disposed on a side of the first pivot outside the insulating container.

7. A device for electrolyzing water according to claim 6, including means forming a collecting chamber of electrolyzed water discharged from said side vent opening of said second pivot.

* * * * *